United States Patent [19]

Gromen

[11] Patent Number: 4,468,789

[45] Date of Patent: Aug. 28, 1984

[54] METHOD FOR SERIAL TRANSMISSION AND RECEIPT OF BINARY INFORMATION

[75] Inventor: William E. Gromen, Ft. Washington, Md.

[73] Assignee: The United States of America as represented by the Director of the National Security Agency, Ft. George C. Meade, Md.

[21] Appl. No.: 322,112

[22] Filed: Nov. 16, 1981

[51] Int. Cl.³ .............................................. H04L 3/00
[52] U.S. Cl. ..................................... 375/25; 375/122; 377/64
[58] Field of Search ....................... 370/43, 44, 49, 82, 370/183; 375/117, 59, 25, 37, 94, 96, 34, 37, 21, 122; 340/347 DD; 364/200; 377/64, 54, 55, 70, 73, 56, 75; 358/260, 261

[56] References Cited

U.S. PATENT DOCUMENTS

| | | | |
|---|---|---|---|
| 3,022,375 | 2/1962 | Davey | 370/49 |
| 4,034,406 | 7/1977 | Tsuchiya et al. | 358/261 X |
| 4,125,746 | 11/1978 | Downey et al. | 370/83 |
| 4,126,764 | 11/1978 | Downey et al. | 370/83 |
| 4,290,143 | 9/1981 | Wissel et al. | 375/25 X |
| 4,358,852 | 11/1982 | Ichikawa et al. | 375/25 |
| 4,366,505 | 12/1982 | Tsuda et al. | 358/260 |
| 4,369,443 | 1/1983 | Giallanza et al. | 455/70 X |

OTHER PUBLICATIONS

Shanmugam, K. Sam, *Digital and Analog Communication Systems,* John Wiley & Sons, N.Y., 1979, pp. 204-205.

*Primary Examiner*—Benedict V. Safourek
*Attorney, Agent, or Firm*—Thomas O. Maser; John R. Utermohle

[57] ABSTRACT

An improved method for serial transmission of binary data. Data words are conveyed over a communications path by means of four discrete signals. Bit value detection circuitry within the transmitter sequentially tests the untransmitted bits. Upon detection of only a single value in all of the untransmitted bits, the value being all ZEROs or all ONEs depending on the embodiment, an end of word signal is transmitted. In the receiver, a register is initialized to the predetermined single value state. Upon receipt of a signal representing the alternate state, the corresponding bit in the register is changed. Receipt of the end of word signal stops the process, at which time the register contains the word which was to be transmitted, thus accelerating the speed at which certain words may be transmitted.

8 Claims, 4 Drawing Figures

METHOD FOR SERIAL TRANSMISSION AND RECEIPT OF BINARY INFORMATION

BACKGROUND OF THE INVENTION

1. Field of the Invention

My invention relates to the field of digital communications, and more specifically to the communication of binary information by means of a serial stream of discrete signals.

2. Background of the Invention

Information is commonly processed and stored in binary form, and often the methods and machines used make is advantageous to group bits together into "words." Different processes and storage devices, however, frequently use different word lengths, i.e., number of bits per word. For example, consider the process of transferring data from one computer to another computer at a different location. First, it is desirable for the human operators to be able to communicate. This can be done efficiently using six bit words to represent the alphanumeric keyboard characters. Next, the destination computer must be sent information such as where to store the data and how many words to expect. It is important that this "control" information be distinguishable from the data, for these control words are to be acted upon, but not stored. Finally, there is the data itself, which must not—regardless of its contents—invoke any control actions in the communication equipment or the computer.

For most efficient operation, the word length of the transmitted words should match that of the computer. But even when restricted to the most common computers, word lengths of 8, 12, 16, 32, and 48 must be considered. Moreover, with the inclusion of each additional word length, the problem of distinguishing the various types of information is exacerbated.

In order to accommodate widely varying word sizes, many current systems compromise on a fixed word length of eight bits, with longer groups being sent as more than one word. The result is that each information group must first be subdivided at the transmitting end, then reassembled at the receiving end. Keyboard characters end up being sent one per word, with two bits wasted.

In order to solve the problem of distinguishing between operator messages, control information, and the data, a rigid format or protocol is often adopted. Most protocols require special characters such as "start-of-header," "start-of-text," and "end-of-text." As a consequence, either circuit complexity or processing overhead is significantly increased. In addition, if the bit patterns corresponding to the special characters randomly occur in the data, there are still more complications.

In some present systems, a continuous, synchronous bit stream—devoid of word delimiters—is transmitted. While this technique is efficient for sending information of varying word lengths, it requires blocking off the stream into "frames." Frame marker bits are inserted periodically, along with control information. The shortcoming of this technique is that a single dropped bit can invalidate all the information within a frame.

SUMMARY OF THE INVENTION

My invention provides a method and for digital communication which, as well as overcoming certain disadvantages of the prior art, incorporates previously unattainable capabilities.

It is an object of my invention to transmit binary words of different lengths efficiently.

It is an object to be able to intermix words of different lengths easily.

It is an object to transmit certain binary words—the all-ZERO word, for example—at a faster rate than other words of the same length.

It is an object to simply and effectively distinguish control or protocol words from data words.

It is an object to allow flexible message formats.

It is an object to provide the transmitted signal with inherent error detection characteristics.

It is an object to maintain correct word division and synchronization even in the presence of dropped or added data bits.

It is an object to be able to correctly receive information even when the signal rate is continuously varying.

A method of communicating which achieves these objectives is based on transmitting a serial stream composed of the following four discrete signals:

(1) a DATA0 signal which represents a binary ZERO information bit;

(2) a DATA1 signal which represents a binary ONE information bit;

(3) a GAP signal which acts as a bit delimiter, separating the bits within a word; and (4) a SYNC signal which acts as a word delimiter.

In a preferred embodiment of my invention, communication begins with the transmission of a SYNC signal, indicating that a binary word is about to be sent. This is followed by a DATA0 or DATA1 signal to represent the right-most bit of the word. The remaining bits to the left are then tested to see if they are all ZEROs. If not, a GAP signal is sent, the right-most bit is dropped from further consideration, and the next bit (immediately to the left) is selected. This bit is now sent as a DATA0 or DATA1 signal, and the bits to its left are tested to determine if they are all ZEROs. If there is at least one ONE remaining in the word, a GAP signal is transmitted, the bit just sent is dropped from any further consideration, and the bit to its immediate left is selected. This process is continued across the word from right to left until there is not a single ONE to the left of the bit being sent. At this point, a SYNC signal is sent.

At the receiving end, it is a simple procedure to reconstruct the binary word as it is being sent. The initial SYNC signal tells the receiver to start with an all-ZERO word and to initialize a pointer to the right-most bit position. The next signal, either DATA1 or DATA0, determines whether the right-most bit gets set to ONE or kept as ZERO, respectively. Reception of a GAP signal causes the pointer to move one position to the left. This process is continued across the word, with a ONE being inserted at the pointer position whenever a DATA1 signal is received. When the next SYNC signal is received, it is interpreted to mean that the binary word is complete, i.e., that all the ONEs have been sent and any remaining bit positions are to remain ZERO.

BRIEF DESCRIPTION OF THE DRAWINGS

My invention may be best understood by reading the description which follows while referring to the drawings, in which.

DESCRIPTION OF THE PREFERRED EMBODIMENT

Figure 1:
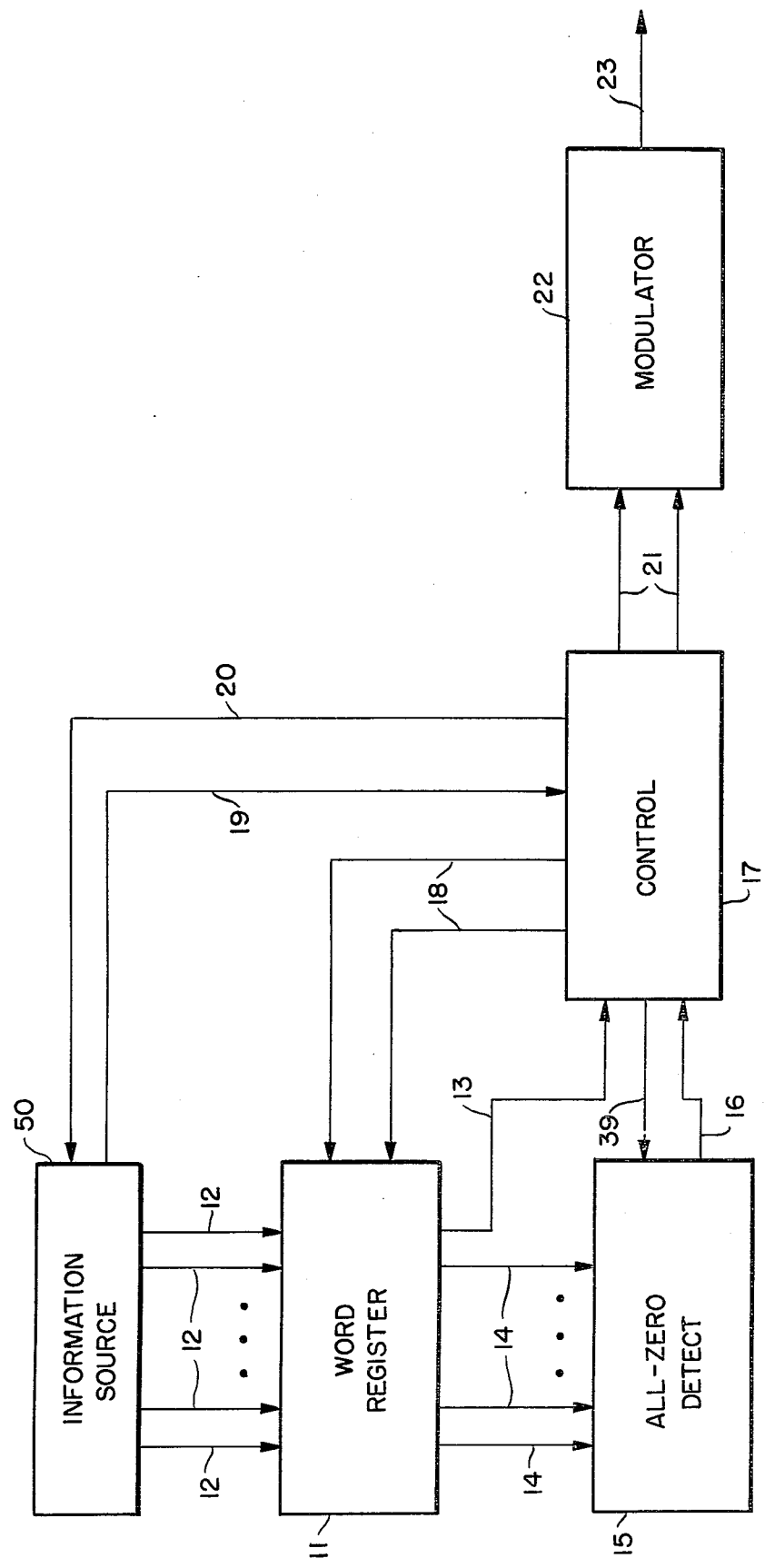
FIG. 1 is a block diagram of the transmitter section of an apparatus for practicing my invention.

Refer to FIG. 1, the block diagram of the transmitter section. A word register 11 is connected to a source of information 50 by data lines 12—12. Word register 11 could be a conventional parallel input register or a plurality of flip-flops capable of receiving one complete word of information. Source 50 might, for example, be a computer. A line 13 provides a signal representative of the content of the right-most bit position of word register 11 to a control circuit 17, while signal lines 14—14 convey the contents of all the remaining bit positions to an all-ZERO detect circuit 15. Detector 15 may be any means for identifying the presence of all ZEROs in those stages of register 11 exclusive of the right-most stage and for providing that information on line 16 to control 17. It could, for example, be a logic AND gate with inverters on each input or possibly a logic OR with an inverter at the output.

Control 17 can be a microprocessor or similar device for initiating the movement of signals through my invention. It provides, via line-pair 18, signals which can cause register 11 either to load a new word from source 50 or to shift its present word by one bit position to the right with a ZERO inserted into the left-most bit position. Control circuit 17 uses line 20 to request a new input word from source 50, and receives notice that it is available via line 19. Binary signals on line-pair 21 instruct a modulator 22 to transmit either, a DATA∅, DATA1, GAP, or SYNC signal on communication path 23. The choice of which of these signals will be transmitted is determined by both the signal on line 13 and that on line 16, as is more fully explained below.

Figure 2:
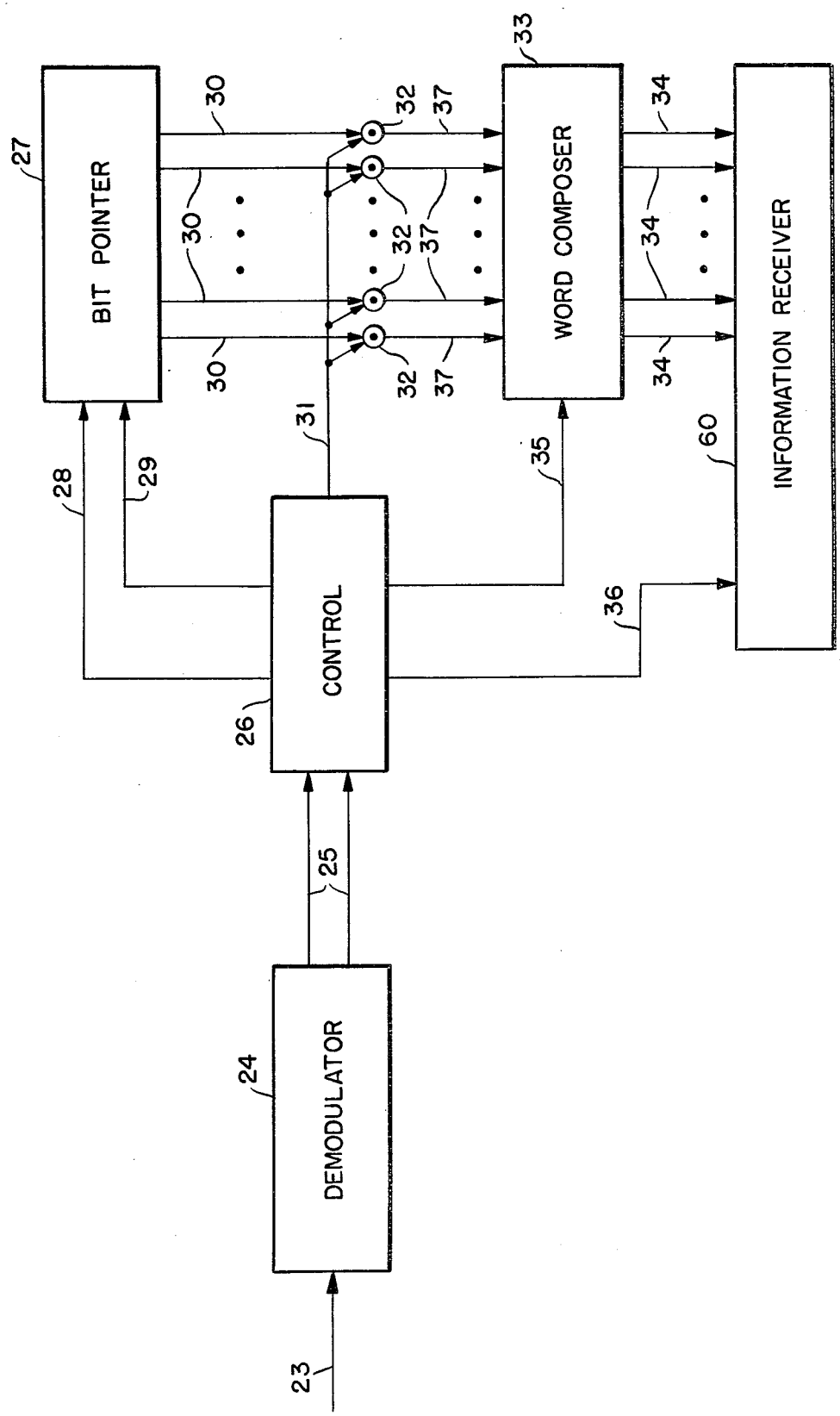
FIG. 2 is a block diagram of the receiver section of an apparatus for practicing my invention.

Refer to FIG. 2, the block diagram of the receiver section. A demodulator 24 receives signals from communication path 23 and informs, via line-pair 25, a control circuit 26 which one of the signals—DATA∅, DATA1, GAP, or SYNC—is being received.

On receipt of a SYNC signal, control circuit 26 uses line 28 to initialize a bit pointer 27 while simultaneously using line 35 to initialize word composer 33. Bit pointer 27 is preferably a conventional shift register. Word composer 33 might be a parallel input register with the input to each stage being independently clocked. Alternatively, word composer 33 could be a plurality of flip-flops, each receiving an input from one of the lines 37—37 and providing an output to one of the lines 34—34. Initialization puts the bit pointer in the state such that all of its output lines 30—30 are ZERO except for the right-most, which is ONE. The word composer is initialized to all ZEROs. On receipt of a GAP signal, line 29 is used to signal a shift of bit pointer 27 such that the single ONE on output lines 30—30 moves one position to the left. On receipt of a DATA1 signal, control 26 places a ONE on line 31, which serves as an input to each of the AND gates 32—32. The single ONE on lines 30—30 acts as a pointer, allowing the ONE on line 31 to pass through exactly one of the AND gates 32—32. When one of the AND gates 32—32 outputs a ONE, it sets the corresponding stage in word composer 33 to a ONE. When an AND gate outputs a ZERO, the corresponding stage of word composer 33 remains unchanged. Lines 34—34 connect the stages of word composer 33 to an information receiving device 60 such as a computer. Line 36 is used to indicate the presence of a completed word on lines 34—34, with subsequent transfer of the word into the information receiver 60.

Figure 3:
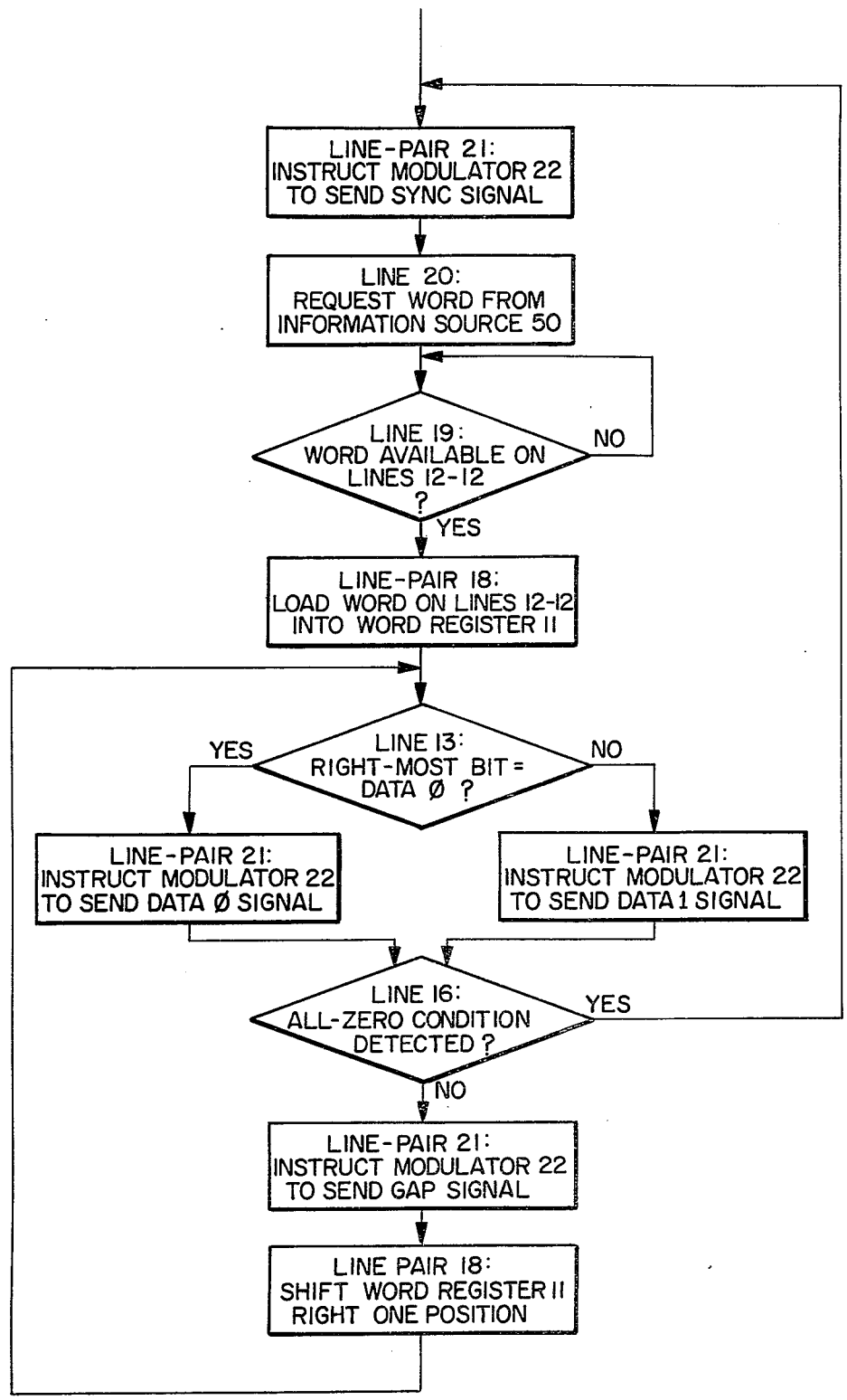
FIG. 3 is a flowchart illustrating the transmission process, which is governed by control 17.
Figure 4:
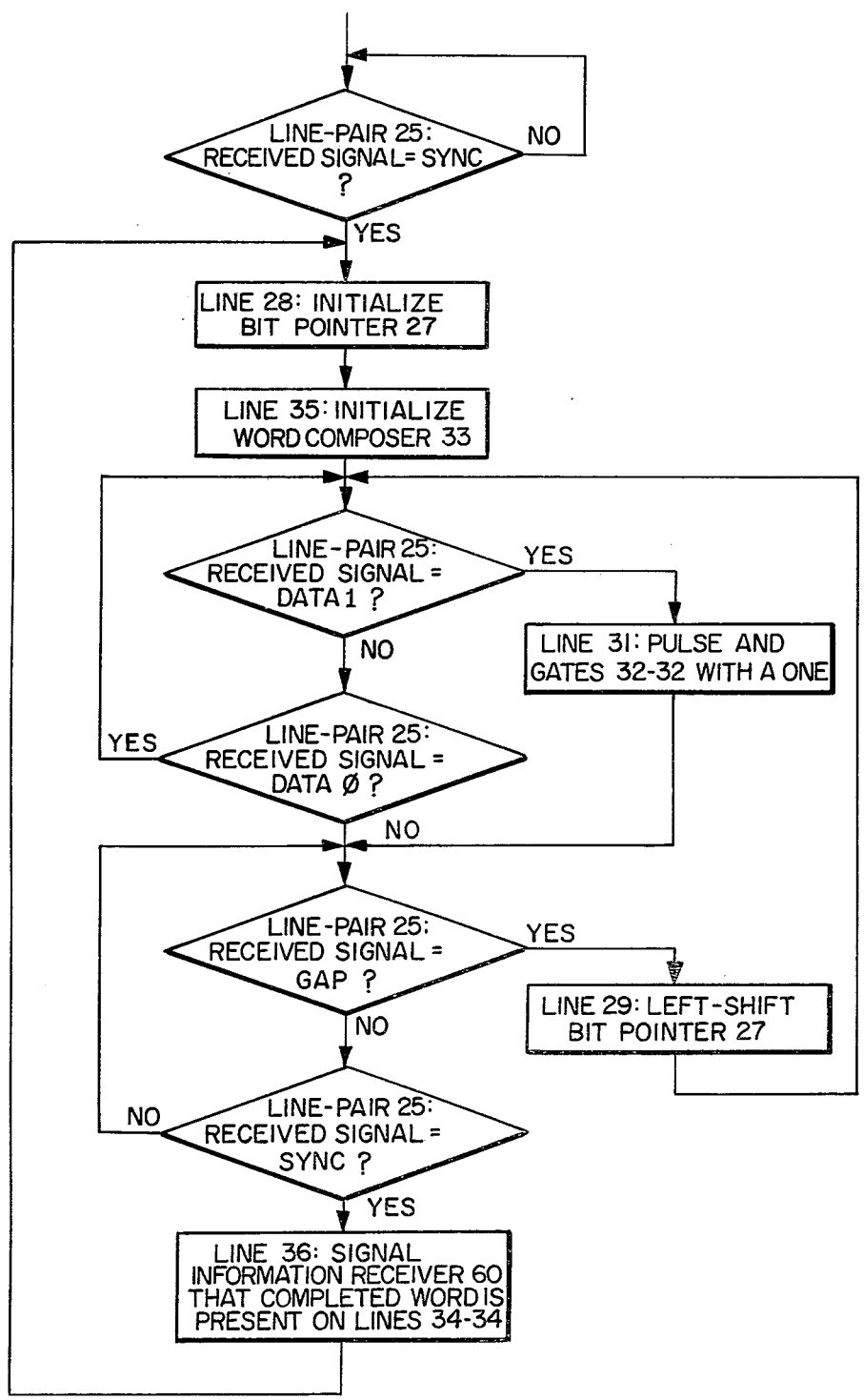
FIG. 4 is a flowchart illustrating the receive process, which is governed by control 26.

In general, there must be as many stages in word register 11, bit pointer 27, and word composer 33 as there are bits in the largest word to be transmitted. Any lesser number of bits may then be transmitted with my invention. For purposes of illustration it will be assumed that each binary word to be transmitted is composed of six bits. As assumed word length of six bits implies that lines 12—12, lines 30—30, lines 34—34, and lines 37—37 will each consist of at least six lines, that lines 14—14 will consist of at least five lines, and that there will be at least six AND gates. Let it further be assumed that two words are to be communicated: 000110 followed by 000000. Throughout the following description, refer to the table below, and the flowcharts of FIGS. 3 and 4, which summarize the process to be described.

| TIME | LINES 12—12 | LINES 14—14 | PATH 23 | LINES 30—30 | LINES 34—34 |
|------|-------------|-------------|---------|-------------|-------------|
| T0 | . . . . . . | . . . . . | SYNC | 0 0 0 0 0 1 | 0 0 0 0 0 0 |
| T1 | 0 0 0 1 1 0 | 0 0 0 1 1 | 0 DATA0 | 0 0 0 0 0 1 | 0 0 0 0 0 0 |
| T2 | . . . . . . | 0 0 0 1 1 | 0 GAP | 0 0 0 0 1 0 | 0 0 0 0 0 0 |
| T3 | . . . . . . | 0 0 0 0 1 | 1 DATA1 | 0 0 0 0 1 0 | 0 0 0 0 1 0 |
| T4 | . . . . . . | 0 0 0 0 1 | 1 GAP | 0 0 0 1 0 0 | 0 0 0 0 1 0 |
| T5 | . . . . . . | 0 0 0 0 0 | 1 DATA1 | 0 0 0 1 0 0 | 0 0 0 1 1 0 |
| T6 | . . . . . . | 0 0 0 0 0 | 1 SYNC | 0 0 0 1 0 0 | 0 0 0 1 1 0 |
| T7 | . . . . . . | . . . . . | SYNC | 0 0 0 0 0 1 | 0 0 0 0 0 0 |
| T8 | 0 0 0 0 0 0 | 0 0 0 0 0 | 0 DATA0 | 0 0 0 0 0 1 | 0 0 0 0 0 0 |
| T9 | . . . . . . | 0 0 0 0 0 | 0 SYNC | 0 0 0 0 0 1 | 0 0 0 0 0 0 |

Control circuit 17 requests the first word by signaling on line 20. At the same time, using line-pair 21, it instructs modulator 22 to send a SYNC signal on communication path 23. At the receiver, demodulator 24 uses line-pair 25 to inform control 26 that SYNC is being received. Control 26 then initializes bit pointer 27 and word composer 33. See the table, time T∅.

When line 19 signals that a word is present on lines 12—12, control circuit 17 uses line-pair 18 to load the first word, 000110, into register 11. Sensing the right-most bit on line 13 to be a ZERO, control 17 instructs modulator 22 to send a DATA∅ signal. At the receiving end, a DATA∅ signal need not cause any action because all word composer bits were initially reset to ZERO. See the table, time T1.

While the right-most bit is being sent, control circuit 17 senses line 16 from all-ZERO detect 15. The all-ZERO detect, having examined the 00011 on lines 14—14, informs control 17 that the unsent portion of the word is not all ZEROs. Control 17 therefore instructs modulator 22 to send a GAP signal. Receipt of a GAP signal by demodulator 24 results in control circuit 26 giving bit pointer 27 a shift-left command on line 29. See the table, time T2.

Concurrent with transmission of the GAP signal, control circuit 17 uses line-pair 18 to give word register 11 a shiftright command. Then, sensing the new right-most bit on line 13 to be a ONE, control 17 instructs modulator 22 to send a DATA1 signal. At the receiver, a DATA1 signal causes control circuit 26 to put a ONE on line 31. The single ONE on bit pointer lines 30—30 allows the ONE on line 31 to pass through the corresponding AND gate and set that bit position of the word composer to ONE. See the table, time T3.

While modulator 22 is sending the DATA1 signal, control circuit 17 examines line 16. Informed that the unsent bits are not all ZEROs, control 17 tells modulator 22 to transmit a GAP signal. At the receiver, the GAP signal results in bit pointer 27 being left-shifted one bit. See the table, time T4.

During the transmission of the GAP signal, the word register 11 gets right-shifted. The new right-most bit being a ONE, control 17 instructs modulator 22 to send a DATA1 signal. On receipt of this DATA1 signal by the demodulator, control circuit 26 sets line 31 to ONE. With a ONE on line 31, a ONE is passed to the word composer input corresponding to the single ONE on bit pointer lines 30—30. As a result, a ONE is inserted into the word composer—no other bit positions are affected. See the table, time T5.

While the modulator is sending the DATA1 signal, control circuit 17 interrogates line 16. The all-ZERO detect, having examined lines 14—14, informs control 17 that they are all ZEROs. Control 17 then commands the modulator to transmit a SYNC signal, indicating that all the ONEs in the word have been sent. At the receiver, control circuit 26 uses line 36 to signal that a completed word is present on word composer output lines 34—34. See the table, time T6.

At this point, the first of the two binary words has been transmitted from input lines 12—12 to output lines 34—34. Control circuit 17 requests the second word via line 20, while control circuit 26 initializers the bit pointer via line 28 and the word composer via line 35. See the table, time T7.

When line 19 signals that a word is ready on lines 12—12, control circuit 17 uses line-pair 18 to enter the second word, 000000, into register 11. Sensing the right-most bit to be a ZERO, control 17 instructs the modulator to send a DATA0 signal. At the receiving end, no action is needed. See the table, time T8.

While the right-most bit is being transmitted, control circuit 17 senses the all-ZERO detect and discovers that the rest of the word is indeed all ZEROs. Control 17 therefore commands the modulator to send a SYNC signal. When informed by the demodulator that SYNC has been received, control circuit 26 uses line 36 to signal that a completed word is available on output lines 34—34. See the table, time T9.

At this point the illustration is complete—the two binary words 000110 and 000000 have been transmitted and received. It can be seen by this illustration that the preferred embodiment of my invention achieves the objectives stated previously.

An alternative embodiment of the transmitter of FIG. 1 would involve the use of word register 11 as a non-shifting register. Line 39 connects detector 15 to control device 17. Transmission of the right-most bit, sensing of lines 14—14 by all-ZERO detect 15, and transmission of a GAP signal occurs as before. A signal on lines 18—18 then causes line 13 to sense the next to right-most bit in register 11, while a signal on line 39 causes detect circuit 15 to observe the signals on all but the right-most of lines 14—14. Successive switching of the signal on line 13 one bit to the left, together with detection of the all-ZERO state in those bit positions to the left of that one line 13, produces an equivalent method for determining when all ONEs have been transmitted.

To transmit words of different lengths efficiently, the apparatus is constructed with enough input and output lines to handle the number of bits in the longest word. Shorter words are then input with ZEROs appended on the left. Since ZEROs to the left of the left-most ONE are not sent, efficiency is maintained.

To intermix words of different lengths, the appended ZEROs technique is again employed.

The transmission rate is faster for words with a string of ZEROs on the left than for words of the same length with ONEs on the left.

To distinguish a control or protocol word from data, simply append one or more ONEs to the left end of the former.

Flexible message formats are a direct consequence of the distinguishability of control and protocol words.

Inherent error detection is provided by the method in which the DATA0, DATA1, GAP, and SYNC signals are employed—only certain sequences are valid.

Maintenance of correct word division and synchronization is the function of the SYNC signal.

To correctly receive data even when the signal rate is continuously varying, the GAP signal is used.

It will be readily apparent to anyone skilled in the art of digital logic design that a number of alternative embodiments exist for the apparatus described herein. As stated previously, word register 11 need not be a shift register—a conventional register connected to bit selection circuitry could be used. Another example is bit pointer 27. Instead of a shift register, a binary counter driving a decoder/demultiplexer could be employed. In such an implementation, the function of line 31 and the AND gates could be absorbed into the demultiplexer.

Over and above the alternatives to individual parts of the apparatus, there exists a dual method and apparatus in which the roles of ONEs and ZEROs are interchanged. In this dual, the all-ZERO detect is replaced by an all-ONE detect, the word composer is initialized to all ONEs, and ZEROs rather the ONEs are inserted into the word composer. In the dual method, an all-ONE word is sent at the fastest rate, rather than an all-ZERO word.

It will be readily apparent to anyone skilled in the art of digital communications that the DATA0, DATA1, GAP, and SYNC signals can be implemented in many ways. Amplitude modulation (AM), frequency shift keying (FSK), phase shift keying (PSK), or any of the various forms of pulse modulation (PAM, PPM, RZ, NRZ, NRZI, PE, ect.) are possible choices. It will also be apparent to anyone skilled in the art that communication path 23 can be realized in a variety of ways. Voltages on a wire cable, electromagnetic wave propagation through the atmosphere, microwaves in a waveguide, and coherent light in a fiber optic cable are but a few. Within the preferred embodiment, binary levels are used on line-pair 21 and line-pair 25: 00 for GAP, 01 for DATA1, 10 for DATA0, and 11 for SYNC. This technique can be used to advantage in cases where the sending and receiving ends are not too far apart. In such cases modulator 22 can simply be a pair of digital line-driver circuits, demodulator 24 a pair of line-receiver circuits, and communication path 23 can be a three wire cable (two signal lines plus ground). The dibit assignments were chosen so that any valid sequence of signals would be represented by a sequence in which consecutive dibits differ in only one bit position. For example, SYNC-DATA1-GAP-DATA0-SYNC is represented by 11-01-00-10-11. This single-change-at-a-time feature provides inherent error detection characteristics. Numerous equivalent assignments exhibiting this feature exist—the choice was somewhat arbitrary.

If the signaling rate were to be held constant, the GAP signal could be eliminated. Doing so would require changes to the method and apparatus described previously, but the changes are straightforward and apparent to anyone skilled in the arts of digital logic design and digital communications. With this and the other modifications in mind, I intend that my invention not be limited to the specific embodiments described, but rather that it be limited only as set forth in the claims which follow.

I claim:

1. A method of transmission of a sequence of binary words, each word consisting of a plurality of bits, each bit having either a first value or a second value, comprising the steps of:
    (a) inserting a word into a word register;
    (b) detecting the value of each bit of said word in said register sequentially, beginning with an end-most bit;
    (c) transmitting, after each detection, a signal representative of the value of the detected bit;
    (d) testing, after each detection, all but the previously detected bits of the word in said register until no tested bits have the second value;
    (e) upon the occurance of no tested bits having the second value, transmitting a signal indicative of the end of transmission of the word; and
    (f) repeating steps (a) through (e) until all words in the sequence have been transmitted.

2. The method of claim 1, further comprising the step of transmitting a bit delimiter signal between each bit signal.

3. The method of claim 1, wherein step (b) includes the further step of shifting all of said bits one stage in the direction of the detected bit and inserting a bit having said first value in the end-most stage opposite that previously occupied by the detected bit.

4. A method of reception of a sequence of binary words transmitted by the process of claim 1, comprising the steps of:
    (a) initializing each stage of a word composer register to said first value;
    (b) detecting each said transmitted signal sequentially;
    (c) upon detection of a signal representing said second value, inserting said second value into a stage of said word composer register, said stage corresponding to the original location of the bit represented by said detected signal in said word register;
    (d) detecting a signal indicative of the end of transmission of the word, and
    (e) repeating steps (a) through (d) until all words in the sequence have been received.

5. The method of claim 4, further comprising the step of detecting a bit delimiter signal between each bit signal.

6. The method of claim 5 wherein step (b) further includes asynchronously detecting each said transmitted signal sequentially.

7. A method of transmission of a sequence of binary words of variable length, each word consisting of a plurality of bits, each bit having either a first value or a second value, comprising the steps of:
    (a) inserting a word into a word register, said word having any length up to and including the number of stages in said register;
    (b) detecting the value of each bit of said word in said register sequentially, beginning with an end-most bit;
    (c) transmitting, after each detection, a signal representative of the value of the detected bit;
    (d) testing, after each detection, all but the previously detected bits of the word in said register until no tested bits have the second value;
    (e) upon the occurance of no tested bits having the second value, transmitting a signal indicative of the end of transmission of the word; and
    (f) repeating steps (a) through (e) until all words in the sequence have been transmitted.

8. A method of transmission of a sequence of binary words, each word consisting of a plurality bits, wherein said sequence is a serial stream composed of four discrete types of signals including a first signal representing a first binary value, a second signal representing a second binary value, a third signal representing a bit delimiter and a fourth signal representing a word delimiter, comprising the steps of:
    (a) inserting a word into a word register;
    (b) transmitting said fourth signal;
    (c) detecting the value of each bit of said word in said register sequentially, beginning with an end-most bit;
    (d) transmitting, after each detection, said first or second signal, as appropriate, representative of the value of the detected bit;
    (e) testing, after each detection, all but the previously detected bits of the word in said register until no tested bits have the second value;
    (f) transmitting, after each test, said third signal; p1 (g) upon the occurance of no tested bits having the second value, transmitting said fourth signal; and
    (h) repeating steps (a) through (g) until all words in the sequence have been transmitted.

* * * * *